US012697863B2

(12) United States Patent
Wu et al.

(10) Patent No.: US 12,697,863 B2
(45) Date of Patent: Aug. 4, 2026

(54) ELECTRIFIED VEHICLE WITH ORIENTED PARKING MECHANISM

(71) Applicant: Ford Global Technologies, LLC, Dearborn, MI (US)

(72) Inventors: Ji Wu, Ann Arbor, MI (US); Michael W. Degner, Novi, MI (US); Wei Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 801 days.

(21) Appl. No.: 17/840,822

(22) Filed: Jun. 15, 2022

(65) Prior Publication Data

US 2023/0406088 A1 Dec. 21, 2023

(51) Int. Cl.
| | |
|---|---|
| *H02K 7/116* | (2006.01) |
| *B60K 6/36* | (2007.10) |
| *B60K 6/387* | (2007.10) |
| *B60T 1/00* | (2006.01) |
| *F16H 63/34* | (2006.01) |
| *B60K 6/38* | (2007.10) |

(52) U.S. Cl.
CPC .............. B60K 6/387 (2013.01); B60K 6/36 (2013.01); B60T 1/005 (2013.01); F16H 63/3425 (2013.01); *B60K 2006/381* (2013.01); *H02K 7/116* (2013.01); *H02K 2213/03* (2013.01)

(58) Field of Classification Search
CPC ...... B60T 1/005; F16H 63/34; F16H 63/3416; F16H 63/3425; F16H 63/3433
See application file for complete search history.

(56) References Cited

U.S. PATENT DOCUMENTS

| | | | |
|---|---|---|---|
| 5,807,205 A | 9/1998 | Odaka et al. | |
| 8,393,423 B2 | 3/2013 | Gwozdek et al. | |
| 11,509,199 B2 * | 11/2022 | Crane .................. | E21B 43/128 |
| 2012/0285755 A1 * | 11/2012 | Keller ................ | F16H 63/3416 |
| | | | 192/219.5 |

(Continued)

FOREIGN PATENT DOCUMENTS

| | | | |
|---|---|---|---|
| JP | 2008132805 A | 6/2008 | |
| JP | 2013193465 A | * 9/2013 | |

OTHER PUBLICATIONS

Hendershot et al, Design of Brushle Permanent Magnet Motors, 1994, pp. 13-10 to 13-14 (Year: 1994).*

(Continued)

*Primary Examiner* — Eric Johnson
(74) *Attorney, Agent, or Firm* — David B. Kelley; Brooks Kushman P.C.

(57) ABSTRACT

An electrified vehicle includes a multi-phase electric machine having a rotor with a number of magnetic pole pairs and secured for rotation with an output shaft. A parking gear secured for rotation with the output shaft has external teeth configured to selectively engage a parking pawl. The parking gear, the rotor, and the output shaft include complementary angular alignment features to angularly orient the parking gear relative to the rotor in an angular position offset by an index angle from one of the magnetic poles of the rotor such that occurrences of the parking pawl being engaged with the parking gear during dead time periods of an inverter powering the electric machine are reduced or eliminated.

17 Claims, 8 Drawing Sheets

(56)     References Cited

U.S. PATENT DOCUMENTS

2020/0164755 A1*    5/2020   Smolenaers ............ B60L 53/53
2020/0391707 A1    12/2020   Hollowell et al.
2021/0199099 A1*    7/2021   Clingman .............. H02K 15/03

OTHER PUBLICATIONS

Kubota, Machine Translation of JP2013193465, Sep. 2013 (Year: 2013).*

* cited by examiner

ELECTRIFIED VEHICLE WITH ORIENTED PARKING MECHANISM

TECHNICAL FIELD

This disclosure relates to a parking mechanism including a parking gear and parking pawl assembly angularly oriented relative to the rotor of an electric machine powered by an inverter in an electrified vehicle.

BACKGROUND

An electrified vehicle such as a hybrid-electric vehicle (HEV) or all-electric vehicle (EV) has a high voltage (HV) traction battery to store and provide energy to an electric machine for vehicle propulsion. The electric machine is typically a three-phase AC machine connected to an inverter powered by the HV battery that converts the power from DC to AC and may include one or more capacitors. During key-off or other situations, it may be desirable to discharge the capacitor(s) associated with the inverter. The electrified vehicle typically includes a parking mechanism having a parking pawl that engages a gap between adjacent teeth of a parking gear after the vehicle gear selector is moved to the Park position and the vehicle is stopped or nearly stopped. Discharge of the inverter capacitor may result in torque being generated by the electric machine that could result in the parking pawl contacting a side of the engaged tooth/gap of the parking gear causing undesirable noise, vibration, and harshness (NVH).

SUMMARY

In various embodiments, an electrified vehicle includes a multi-phase electric machine having a rotor with a number of magnetic pole pairs and secured for rotation with an output shaft. A parking gear secured for rotation with the output shaft has external teeth configured to selectively engage a parking pawl. The parking gear, the rotor, and the output shaft include complementary angular alignment features to angularly orient the parking gear relative to the rotor in an angular position offset by an index angle from one of the magnetic poles of the rotor such that occurrences of the parking pawl being engaged with the parking gear during dead time periods of an inverter powering the electric machine are reduced or eliminated.

Embodiments may also include a method comprising aligning a parking gear having a plurality of external teeth configured to selectively engage a parking pawl between adjacent ones of the external teeth and secured for rotation with an output shaft of an electric machine, relative to a magnetic pole pair of a rotor of the electric machine to minimize occurrences of the parking pawl being engaged between adjacent ones of the external teeth during dead time periods of an inverter supplying power from a traction battery to the electric machine.

In one or more embodiments, an electrified vehicle includes a multi-phase electric machine having a first number of phases and including a stator surrounding and separated by an air gap from a rotor having a second number of magnetic pole pairs, the rotor secured for rotation with an output shaft of the electric machine, and a parking gear secured for rotation with the output shaft of the electric machine and having a third number of external teeth spaced around a circumference configured to selectively engage a parking pawl between adjacent external teeth, the parking gear, the rotor, and the output shaft including complementary angular alignment features to angularly orient the parking gear relative to the rotor in an angular position offset by an index angle from one of the magnetic poles of the rotor.

The angular position or index angle may be based on, selected, or determined by the number of phases, the number of pole pairs, and the number, spacing, or positioning of the external teeth. The number of external teeth corresponds to a numerical factor of two times the first number of phases multiplied by the second number of pole pairs. In one embodiment, the electric machine is a three-phase electric machine, the rotor has four magnetic pole pairs, and the parking gear has eight external teeth. The index angle may be based on an angular position of the parking pawl. The output shaft may include an external spline cooperating with an internal spline of the parking gear to secure the parking gear for rotation with the output shaft, wherein the complementary angular alignment features include a pattern of omitted ridges around the circumference of one of the output shaft and the parking gear corresponding with a pattern of widened ridges around the circumference of the other of the output shaft and the parking gear. The complementary angular alignment features may include stamped alignment marks on at least two of the rotor, the parking gear, and the output shaft.

In various embodiments, the electrified vehicle includes a traction battery and an inverter coupled to the traction battery and operable to convert direct current (DC) power from the traction battery to multi-phase alternating current (AC) power provided to the electric machine by controlling a pair of switches associated with each one of the phases of the multi-phase AC power, and having a number of dead time periods and associated rotor angular positions when both switches of any of the pairs of switches are off. The parking gear, the rotor, and the parking pawl are angularly positioned relative to each other to minimize the number of dead time periods that coincide with the parking pawl being aligned between adjacent external teeth of the parking gear. The parking gear may include asymmetrically sized or spaced external teeth to reduce, minimize, or eliminate the number of dead time periods of an inverter that powers the electric machine that coincide with the parking pawl being aligned between adjacent external teeth of the parking gear.

In one or more embodiments, a method includes aligning a parking gear having a plurality of external teeth configured to selectively engage a parking pawl between adjacent ones of the external teeth and secured for rotation with an output shaft of an electric machine, relative to a magnetic pole pair of a rotor of the electric machine to minimize occurrences of the parking pawl being engaged between adjacent ones of the external teeth during dead time periods of an inverter supplying power from a traction battery to the electric machine. The method may include aligning a marking on the parking gear with a marking on the output shaft before securing the parking gear for rotation with the output shaft. The markings may be stamped, embossed, engraved, formed, etc. on or in the components to be aligned. In one or more embodiments, aligning the parking gear comprises aligning a key on either the parking gear or the output shaft with a complementary slot on the output shaft or the parking gear, respectively. The parking gear is aligned to reduce, minimize, or eliminate occurrences of the parking pawl being engaged between adjacent ones of the external teeth during dead time periods of the inverter.

Embodiments may also include a vehicle powertrain having an electric machine including a rotor with a plurality of magnetic pole pairs, the rotor secured for rotation with an output shaft, and a parking gear having external teeth configured to selectively engage a parking pawl between adjacent ones of the external teeth, the parking gear secured for rotation with the output shaft and angularly oriented relative to the magnetic pole pairs of the rotor such that the parking pawl overlaps at least a portion of an associated one of the external teeth for a plurality of rotor positions associated with dead time periods of an inverter configured to power the electric machine. The parking gear and the output shaft may include complementary alignment features, such as alignment marks stamped, embossed, engraved, or formed in the components. The alignment features may specify a single unique rotational position or may provide multiple possible rotational positions that achieve the same reduction, minimization, or elimination of coincidence of parking pawl engagement with the parking gear during rotor positions corresponding to inverter dead time periods. The complementary alignment features may include asymmetrical alignment features providing a single angular alignment, or symmetrical alignment features providing a plurality of potential angular alignments. The rotor positions may correspond in number to twice the number of magnetic pole pairs multiplied by a number of phases of the electric machine.

One or more embodiments according to the disclosure may have associated advantages. For example, embodiments may reduce noise, vibration, and harshness during capacitor discharge at key-off with an electrified vehicle in Park by aligning the parking gear relative to the electric machine rotor to reduce, minimize, or eliminate parking pawl engagement during dead time periods of the inverter powering the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

Figure 1:
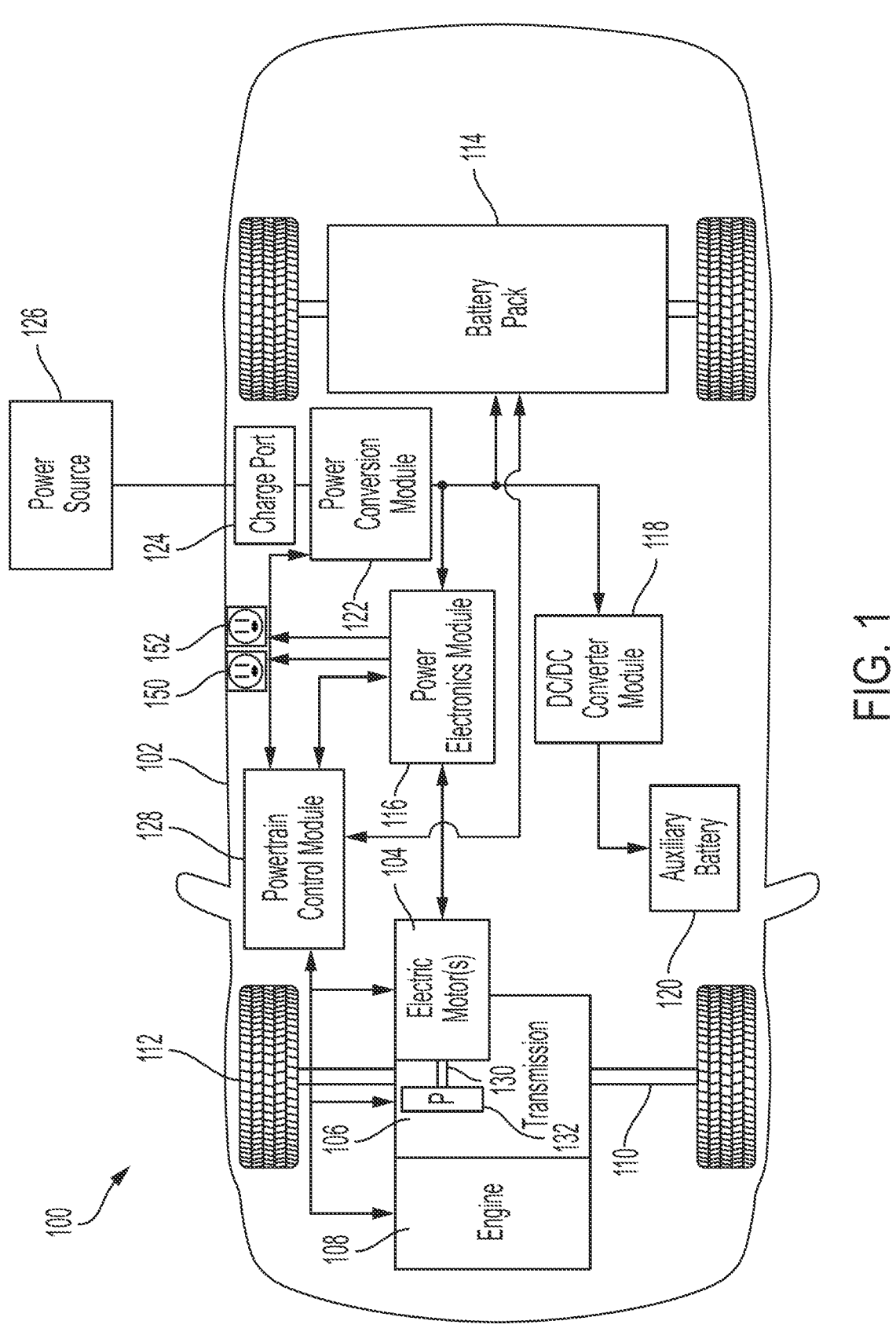
FIG. 1 is block diagram of an electrified vehicle implemented as a hybrid-electric vehicle.

FIG. 1 depicts an example of an electrified vehicle 100 implemented as a plug-in hybrid-electric vehicle. The electrified vehicle 100 may comprise one or more multi-phase electric machines 104 having an output shaft 130 mechanically connected to a parking mechanism (P) 132 of a transmission 106. In addition, the transmission 106 is mechanically connected to an engine 108 for hybrid implementations. The parking mechanism (P) 132 of transmission 106 is mechanically connected to a drive shaft 110 that is mechanically connected to the wheels 112. The parking mechanism (P) 132 includes a parking gear with gaps and teeth and a parking pawl that may selectively engage the parking gear when the vehicle gear selector is in Park to prevent the electric machine output shaft 130 and connected vehicle drive shaft 110 from rotating. The electric machines or motor/generators 104 can provide propulsion whether the engine 108 is turned on or off. The electric machines 104 can also provide regenerative braking. The electric machines 104 may operate as motors, generators, or both and can provide fuel economy benefits by recovering energy that would normally be lost as heat. Electrified vehicle 100 may also be implemented as a battery electric vehicle without an engine 108 and powered solely by traction battery 114 via an inverter.

Traction battery or battery pack 114 stores energy that can be used by the electric machines 104. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 may convert the DC voltage to a three-phase AC current as required by the electric machines 104 and may also be referred to as an inverter in various applications. In a regenerative mode, the power electronics module 116 will convert the three-phase AC current from the electric machines 104 acting as generators to the DC voltage required to recapture energy in the battery pack 114.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric machines, battery, power conversion, power electronics, and various other control modules, components, or systems may be controlled by one or more controllers that may be referred to as a powertrain control module (PCM) 128. Alternatively, or in combination, various systems or subsystems may include associated control modules or controllers in communication with PCM 128 over a vehicle wired or wireless network to provide coordinated control of the vehicle.

Figure 2:
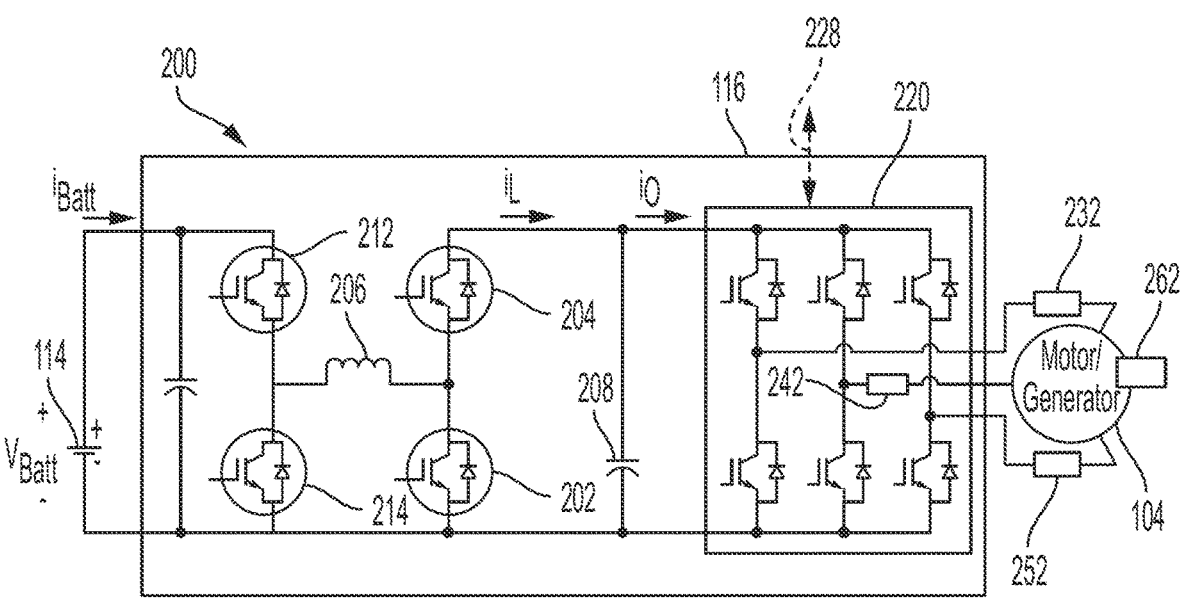
FIG. 2 is a block diagram illustrating an electrified vehicle having a traction battery powering an electric machine via an inverter.

FIG. 2 illustrates a traction battery 114 coupled to a power electronics module 116 connected to a multi-phase electric machine 104, implemented by a three-phase electric machine in a representative electrified vehicle 100. One or more contactors or high voltage switches controlled by an associated controller, such as powertrain control module 128, may be operated to selectively connect battery voltage from battery 114 to power electronics module 116 after completing various diagnostic routines in response to a vehicle start. These high voltage switches may be implemented by relays, insulated gate bipolar junction transistors (IGBTs), metal oxide semiconductor field effect transistors (MOSFEs), bipolar junction transistors (BJTs), and/or other electro-mechanical or solid state switches. The system may include a pre-charge circuit to limit the current flow from battery 114 while the system is powering up.

Power electronics module 116 may include buck-boost converter circuitry 200 upstream of inverter components 220 to drive one or more electric machines 104. The power electronics module 116 may include a boost circuit with an inductor 206, a switch 212 to charge an electric field in the inductor 206, and a switch 214 to discharge the electric field and change the voltage to drive the motor/generator 104. This power electronics module 200 may also include a buck circuit using inductor 206 and switches 202 and 204. This DC/DC convertor circuit will convert the battery voltage to an operational voltage which may be greater than the battery terminal voltage. The buck-boost power converter 200 may use IGBTs, BJTs, MOSFETs, relays, or other electro-mechanical or solid-state switches. The use of IGBTs with Fast Recovery Diodes (FRDs) in this diagram is exemplary and may be accomplished using MOSFETs, BJTs, or other electro-mechanical or solid-state switches. One or more capacitors, represented by capacitor 208 may be used to filter the voltage generated by the DC/DC convertor so that the operational voltage applied to the inverter 210 is generally stable.

As previously described, inverter 220 converts the DC voltage/current to a three-phase AC voltage/current provided to electric machine 104. Inverter 220 communicates with an associated controller as indicated at 228 to operate the corresponding switches of the inverter to generate an AC waveform at a commanded voltage from the DC voltage/current provided by the traction battery 114 with an upper and lower switching pair associated with each phase. Due to finite switching time and tolerances of the switches, inverter dead time or blanking time occurs when both the upper and lower switches are off to reduce or eliminate cross-conduction or shoot through current through the corresponding phase leg. Electric machine 104 may include a resolver or other rotational position sensor 262 that provides a corresponding signal indicative of rotational position of the rotor of electric machine 104. The rotational position sensor 262 may communicate with an associated controller or processor that performs feedback control of rotor position and related current commands for inverter 220 to deliver to each phase of electric machine 104 to control associated torque.

During key-off or other situations of electrified vehicle 100, it is desirable to discharge the capacitor(s) 208 inside the power electronics module 200 that powers the electric machine 104. A commonly used method is to command via a controller communication 228 a d-axis current to the permanent magnet motor 104 so no torque is generated during the process. However multiple reasons could result in motor 104 producing some torque during this process. For example, when a phase current is close to zero, it is difficult to precisely control the current due to the dead time effect of the inverter. This could produce a q-axis current which in turn produces motor torque. If the parking pawl is engaged with the parking gear, this torque could result in the parking pawl contacting the side of the tooth of the parking gear and suddenly stop the movement, causing noise and harshness.

Figure 3:
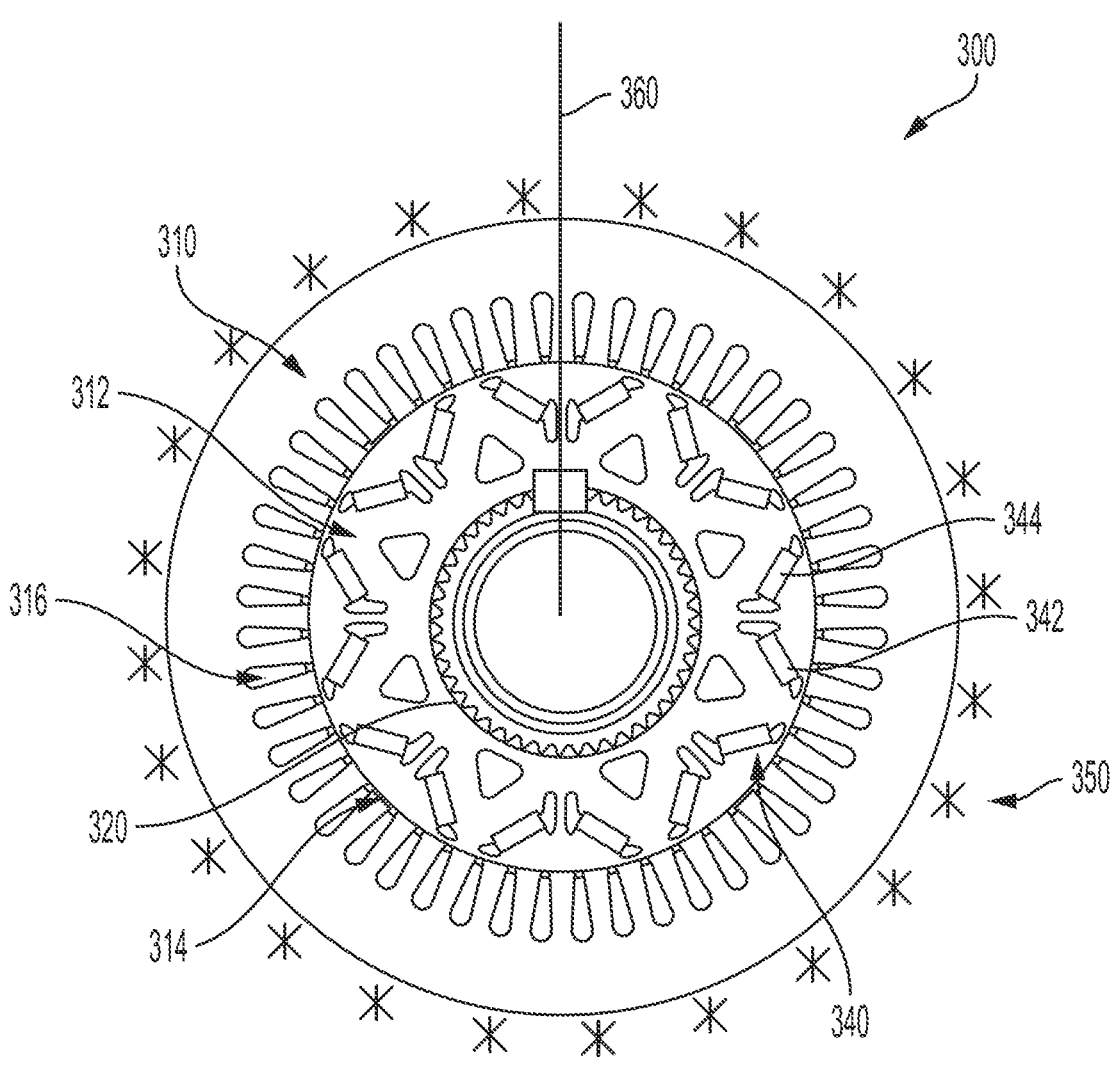
FIG. 3 illustrates an electric machine stator and rotor with inverter deadtime positions relative to magnetic pole pairs of the rotor.

FIG. 3 illustrates an electric machine stator and rotor with inverter deadtime positions relative to magnetic pole pairs of the rotor. Electric machine components 300 include a stationary stator 310 surrounding a rotatable rotor 312 separated by an air gap 314. Stator 310 includes windings 316 within slots of the stator and associated with each electric phase of the machine. Rotor 312 is secured for rotation with an input/output shaft 320. Rotor 312 includes a plurality of permanent magnet pairs 340 each including a first permanent magnet 342 and second permanent magnet 344 that may be positioned relative to one another in a "V" shape or various other configuration that combine with opposing permanent magnet pairs to create a magnetic pole pair. In each electrical cycle for a multi-phase electric machine 104 with "X" phases (typically three but not limited to three), and "P" pole pairs, there are 2*X*P positions 350 of rotor 312 that are affected by inverter deadtime effect that could possibly create torque. In the example of FIG. 3, a three-phase electric machine with four magnetic pole pairs (generated by eight permanent magnet pairs) results in 2*3*4=24 positions 350 where inverter deadtime could result in a small motor torque being generated during capacitor discharge. For convenience of description, a rotor index 360 is provided to characterize the angular location or relationship between a magnetic pole pair of the rotor 312, the input/output shaft 320, and the deadtime positions 350.

The present inventors have recognized that it is desirable to reduce, minimize, or eliminate situations where a capacitor discharge event occurs that could generate a small motor torque due to the inverter deadtime effect while the parking pawl is engaged with the parking gear. As illustrated in FIG. 3, rotor 312 and input/output shaft 320 include complementary splines that allow any angular orientation (as limited by the angular spacing of the spline ridges) between the rotor 312 and the input/output shaft. However, as described in greater detail herein, the present disclosure provides various complementary angular alignment features to limit the number of angular orientations of the rotor 312 and/or parking gear secured to the input/output shaft 320 to those orientations that reduce, minimize, or eliminate occurrence of inverter dead time positions with the parking pawl engaged with the parking gear to reduce or eliminate associated NVH.

Figures 4, 5A, 5B, 5C:
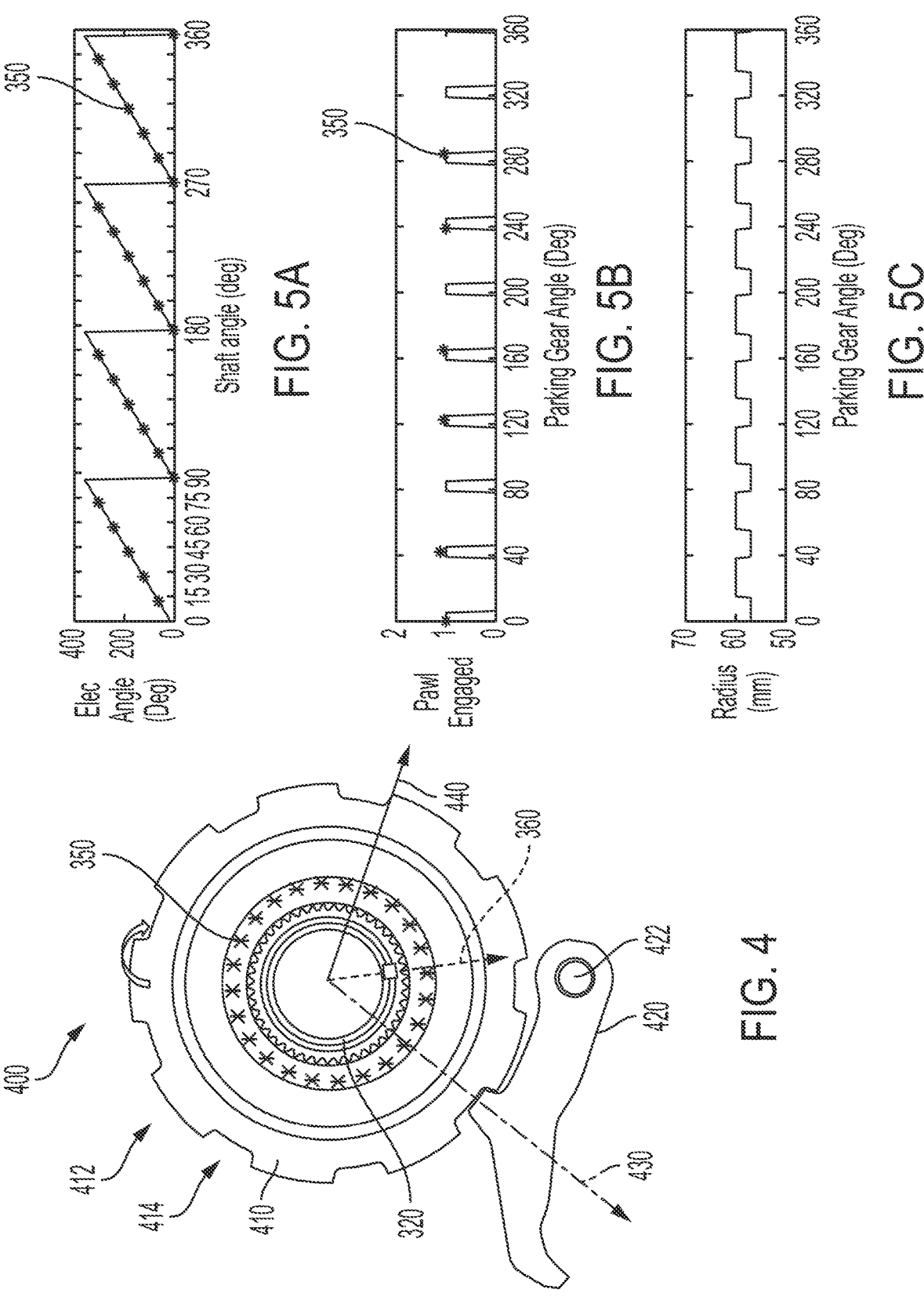
FIG. 4 illustrates a parking pawl and nine-tooth parking gear secured for rotation on an electric machine output shaft with representative inverter dead time positions for a selected rotor angular position.
FIGS. 5A-5C are plots illustrating inverter deadtime angle relative to parking gear and parking pawl angle at a selected rotor index angle for the parking gear assembly illustrated in FIG. 4.

FIG. 4 illustrates a parking pawl and nine-tooth parking gear secured for rotation on an electric machine output shaft with representative inverter dead time positions for a selected rotor angular position. Parking gear assembly 400 includes a parking gear 410 having a plurality of external teeth 412 defining associated gaps, spaces, or notches 414. In this representative embodiment, parking gear 410 includes nine (9) external teeth 412. A parking pawl 420 selectively pivots about an associated pin 422 to engage one of the spaces 414 between adjacent teeth 412 in response to an associated control signal and control of an actuator (not shown) in response to a gear selector (not shown) being placed in a Park position. Parking gear 410 is secured for rotation to input/output shaft 320 with the orientation of the parking gear relative to the electric machine rotor represented by the rotor index 360. The angular position of the parking pawl 420 is represented by a pawl angle 430 passing through the center of the engagement portion of the parking pawl 420 for convenience of description. Similarly, a gear notch angle represented at 440 corresponds to position of the parking gear tooth 412 or notch 414 for convenience of description of the relative angular orientation between the electric machine rotor (represented by rotor index 360), input/output shaft 320, and parking gear 410 and associated inverter deadtime positions 350.

FIGS. 5A-5C are plots illustrating inverter deadtime angle relative to parking gear and parking pawl angle at a selected rotor index angle for the parking gear assembly illustrated in FIG. 4. FIG. 5A illustrates the electrical angle and deadtime angle 350 as a function of input/output shaft angle. As illustrated, the deadtime angles or positions corresponding to deadtime periods of the inverter occur every 15 degrees of input/output shaft angle and electrical angle, with the electrical shifted or offset by the rotor index relative to the shaft angle. As shown in FIG. 5B, parking pawl engagement may occur in any of the nine gaps 414 between adjacent teeth 412 of the parking gear 410. Based on this selected rotor index 360, the gaps occur at parking gear angles as shown in Figure based on the parking gear teeth/gaps as illustrated in FIG. 5C. The arrangement illustrated in FIG. 4 with the orientation between the rotor, parking gear (with nine teeth/gaps), and parking pawl angle results in six occurrences or coincidences of inverter deadtime positions 350 with the parking pawl engaged as illustrated in FIGS. 5A-5C.

Figures 6, 7A, 7B, 7C:
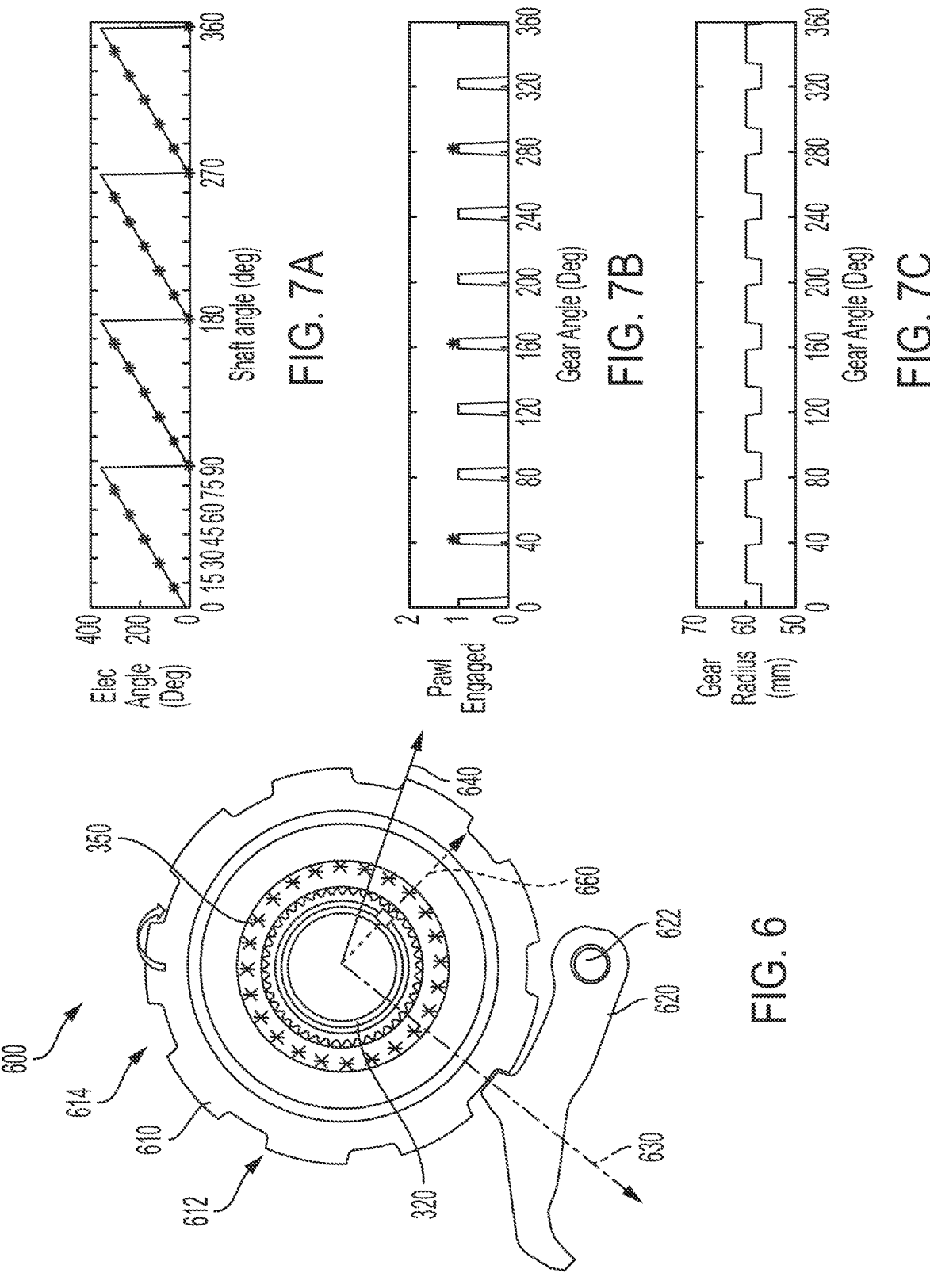
FIG. 6 illustrates a parking pawl and nine-tooth parking gear with representative inverter dead time positions for a selected rotor angular position.
FIGS. 7A-7C are plots illustrating inverter deadtime angle relative to parking gear and parking pawl angle at a selected rotor index angle for the parking gear assembly illustrated in FIG. 6.

FIG. 6 illustrates a parking pawl and nine-tooth parking gear with representative inverter dead time positions for a selected rotor angular position. FIGS. 6 and 7A-7C illustrate a reduction in occurrences or coincidences of inverter dead-time positions 350 with the parking pawl engaged relative to the arrangement illustrated in FIGS. 4 and 5A-5C. Similar to the parking mechanism illustrated in FIG. 4, parking gear assembly 600 includes a parking gear 610 having a plurality of external teeth 612 defining associated gaps, spaces, or notches 614. In this representative embodiment, parking gear 610 includes nine (9) external teeth 612. A parking pawl 620 selectively pivots about an associated pin 622 to engage one of the spaces 614 between adjacent teeth 612 in response to an associated control signal and control of an actuator (not shown) in response to a gear selector (not shown) being placed in a Park position. Parking gear 610 is secured for rotation to input/output shaft 320 with the orientation of the parking gear relative to the electric machine rotor represented by the rotor index 660. The angular position of the parking pawl 620 is represented by a pawl angle 630 passing through the center of the engagement portion of the parking pawl 620 for convenience of description. Similarly, a gear notch angle represented at 640 corresponds to position of the parking gear tooth 612 or notch 614 for convenience of description of the relative angular orientation between the electric machine rotor (represented by rotor index 660), input/output shaft 320, and parking gear 610 and associated inverter deadtime positions 350. As illustrated in FIGS. 7A-7C, the parking mechanism arrangement with orientation of a rotor, parking gear, and parking pawl relative to inverter deadtime positions results in only three occurrences or coincidences (FIG. 7B) of inverter deadtime positions 350 with the parking pawl engaged.

Figures 8, 9A, 9B, 9C:
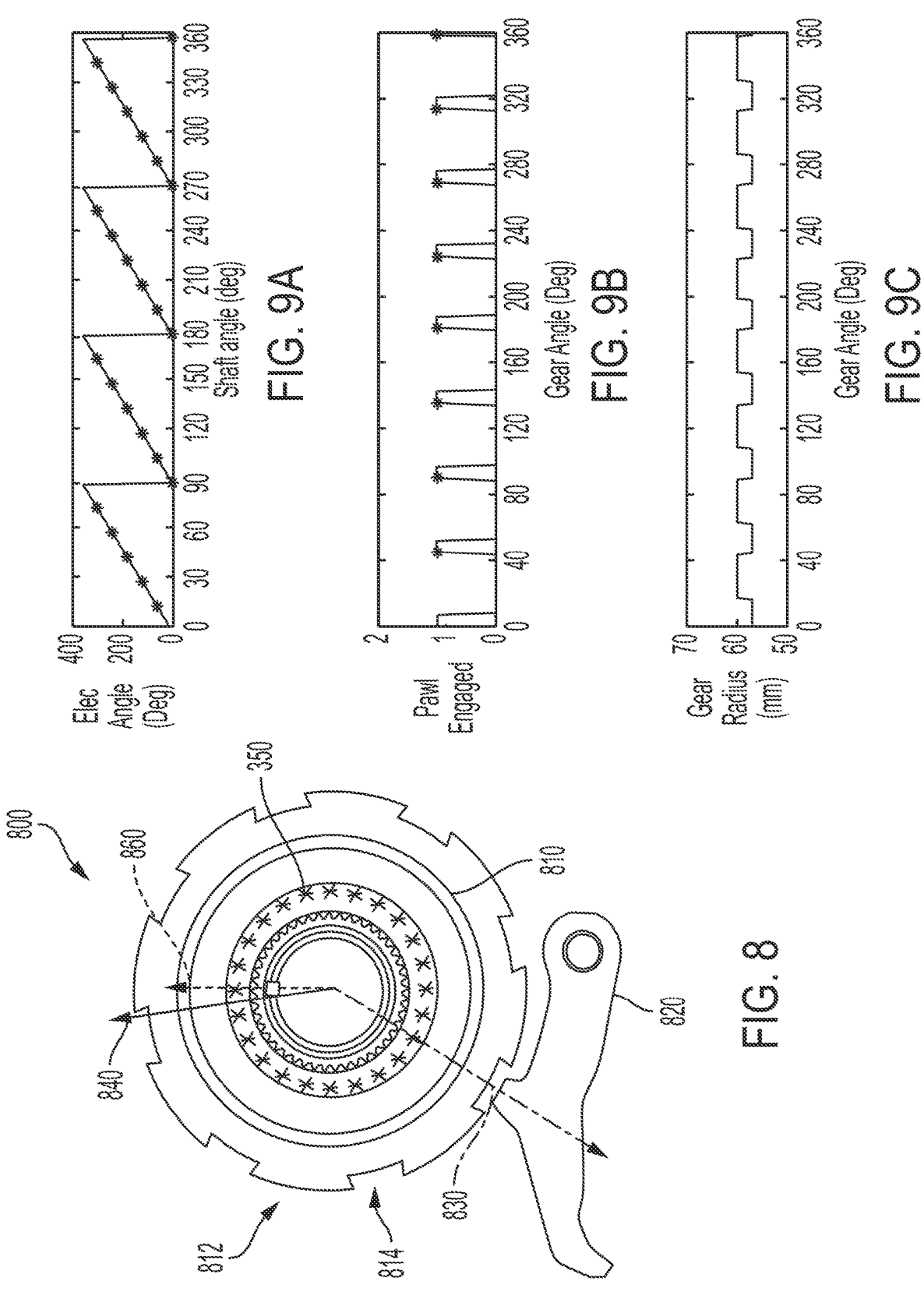
FIG. 8 illustrates an eight-tooth parking gear and parking pawl with representative inverter dead time positions for a selected rotor angular position.
FIGS. 9A-9C are plots illustrating inverter deadtime angle relative to parking gear and parking pawl angle at a selected rotor index angle for the parking gear assembly illustrated in FIG. 8.

FIG. 8 illustrates an eight-tooth parking gear and parking pawl with representative inverter dead time positions for a selected rotor angular position. Parking mechanism 800 includes a parking gear 810 having eight teeth 812 and eight gaps 814 oriented at a gear notch angle 840 relative to a rotor index 860, with a parking pawl 820 located at a pawl angle 830. As illustrated in FIGS. 9A-9C, the arrangement of parking mechanism 800 results in eight occurrences or coincidences (FIG. 9B) of inverter deadtime positions 350 with the parking pawl engaged.

Figures 10, 11A, 11B, 11C:
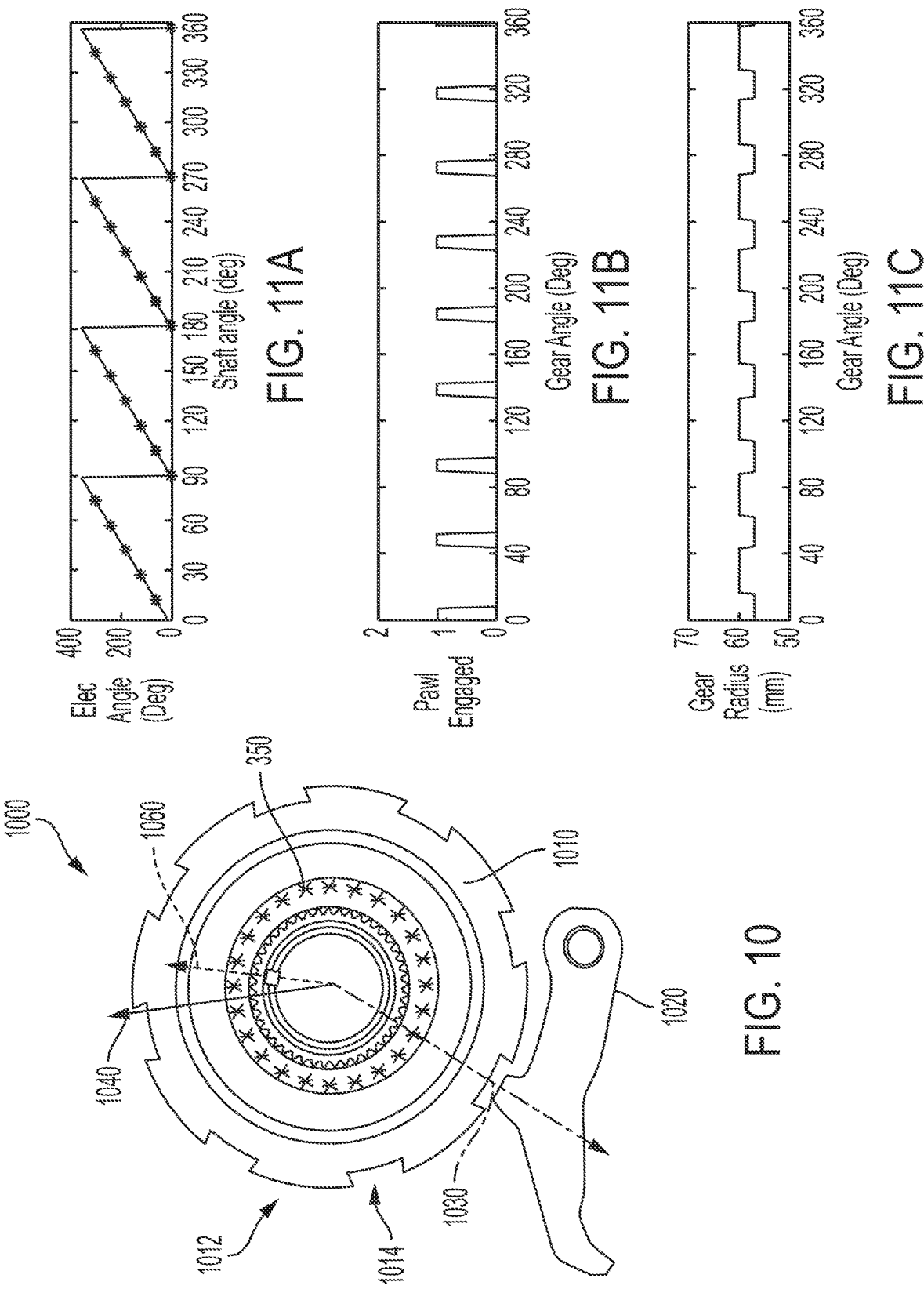
FIG. 10 illustrates an eight-tooth parking gear and parking pawl with representative inverter dead time positions for a selected rotor angular position.
FIGS. 11A-11C are plots illustrating inverter deadtime angle relative to parking gear and parking pawl angle at a selected rotor index angle for the parking gear assembly illustrated in FIG. 10.

FIG. 10 illustrates an eight-tooth parking gear and parking pawl with representative inverter dead time positions for a selected rotor angular position. Parking mechanism 1000 includes a parking gear 1010 having eight teeth 1012 and eight gaps 1014 oriented at a gear notch angle 1040, as well as a parking pawl 1020 at a pawl angle 1030 similar to parking mechanism 800 of FIG. 8. However, rotor index 1060 is selected differently from rotor index 860 to eliminate occurrences or coincidences of inverter deadtime positions 350 with the parking pawl engaged as illustrated in FIGS. 11A-11C. As noted, none of the inverter deadtime positions shown in FIG. 11A coincide with the parking pawl engaged positions as shown in FIG. 11B for the eight-tooth parking gear orientation as shown in FIG. 11C.

Conventional gear manufacturing has a uniformly distributed spline or similar mechanism to allow assembly of the parking gear onto the electric motor input/output shaft. As described herein, depending on how the gear is designed and/or assembled, it is possible that some positions or alignments result in inverter deadtime occurrences with the parking pawl engaged, while other positions have fewer or none of these occurrences. The present inventors have recognized that a mechanism can be designed to only assemble the parking gear to the input/output shaft of the electric machine at a unique position, or a limited number of acceptable positions, so that the possibility of the deadtime effect happening with the pawl inside the gap is reduced or eliminated.

Figure 12A:
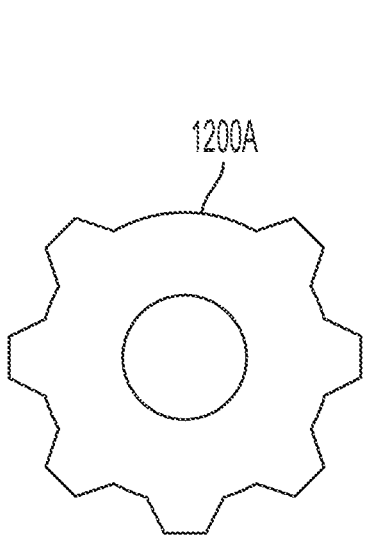
FIGS. 12A-12D illustrate representative alignment features for angular alignment of a parking gear relative to an electric machine rotor on the output shaft of the electric machine to reduce, minimize, or eliminate occurrences of parking pawl engagement during inverter dead time.
Figure 12B:
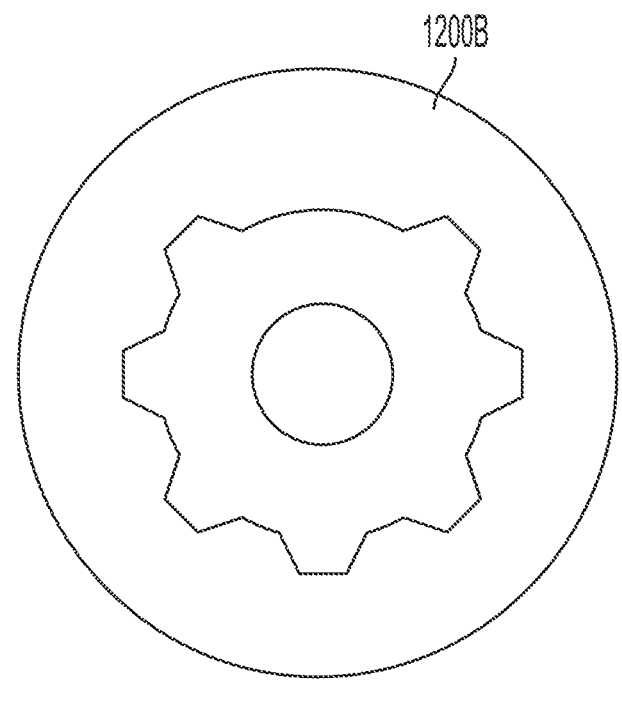
Figure 12C:
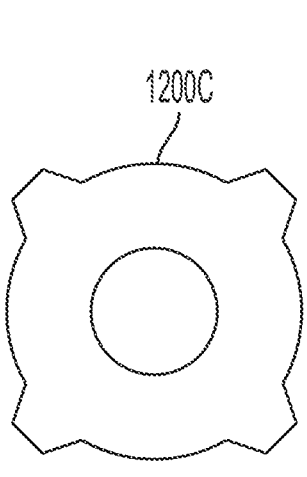
Figure 12D:
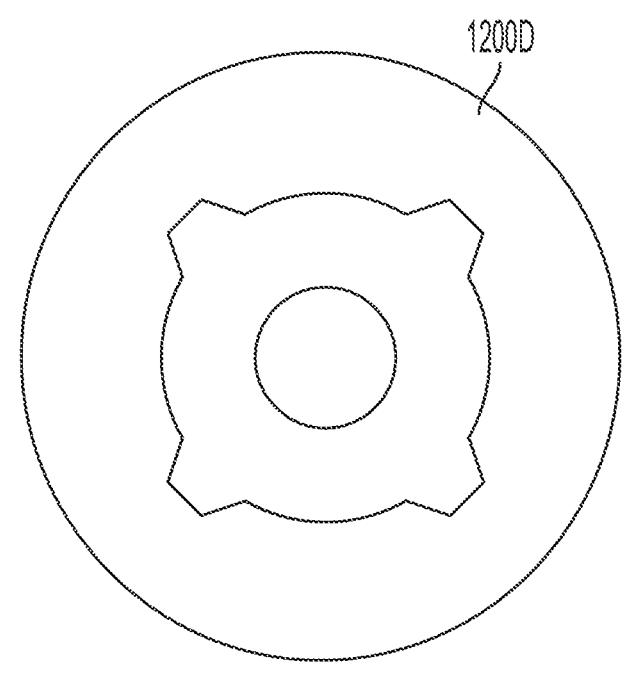

FIGS. 12A-12D illustrate representative alignment features for angular alignment of a parking gear relative to an electric machine rotor on the output shaft of the electric machine to reduce, minimize, or eliminate occurrences of parking pawl engagement during inverter dead time. FIG. 12A illustrates a representative asymmetric external profile for an output shaft 1200A and complementary internal profile of a parking gear 1200B (external teeth/gaps not shown) to provide a selected alignment to reduce, minimize, or eliminate occurrences of inverter deadtime positions with the parking pawl engaged as previously described. As illustrated, the asymmetric alignment features provide a unique or single angular orientation for the components and secure the components for rotation. FIGS. 12C-12D provide a representative symmetric external profile for an output shaft 1200C and complementary internal profile of a parking gear 1200D (external teeth/gaps not shown) to provide a limited number of acceptable alignments or angular orientations to reduce, minimize, or eliminate occurrences of inverter deadtime positions with the parking pawl engaged as previously described.

Various other methods to connect and orient the parking gear to the input/output shaft of the electric machine may be used, including but not limited to keyways (slot and key), bolts, gear mechanism, shrink fit etc. In these cases, the spline can be replaced with any design that provides a unique coupling position or positions. Other strategies may include symmetrical or asymmetrical alignment features having different sizes or shapes. Complementary alignment features may also include an identifiable stamp or mark on the components to be aligned, such as an ink mark, or embossed, engraved, indent, etc. Alternatively, the parking gear can be an integrated part of the electric machine or transmission output shaft, reducing the need to assemble. The angular alignment positions would be predetermined during manufacturing.

In one embodiment, the number $2*X*P$ previously described is divisible by the number of gaps/notches/teeth of the parking gear. For example, for a four pole pair (P=4), three phase electric machine (X=3), 24 possible deadtime positions exist in one mechanical revolution. Appropriate orientation of the components as described and illustrated herein may be used to eliminate inverter deadtime coincidence with the parking pawl engaged, rather than a random alignment that may result in up to 8 occurrences as previously described.

As generally illustrated with reference to FIGS. 1-13, a method according to one or more embodiments of this disclosure includes aligning a parking gear having a plurality of external teeth configured to selectively engage a parking pawl between adjacent ones of the external teeth and secured for rotation with an output shaft of an electric machine, relative to a magnetic pole pair of a rotor of the electric machine to minimize occurrences of the parking pawl being engaged between adjacent ones of the external teeth during dead time periods of an inverter supplying power from a traction battery to the electric machine. The method may include aligning a marking on the parking gear with a marking on the output shaft before securing the parking gear for rotation with the output shaft. The markings may be stamped, embossed, engraved, formed, etc. on or in the components to be aligned. In one or more embodiments, aligning the parking gear comprises aligning a key on either the parking gear or the output shaft with a complementary slot on the output shaft or the parking gear, respectively. The parking gear is aligned to reduce, minimize, or eliminate occurrences of the parking pawl being engaged between adjacent ones of the external teeth during dead time periods of the inverter.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media.

Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:

a multi-phase electric machine having a first number of phases and including a stator surrounding and separated by an air gap from a rotor having a second number of magnetic pole pairs, the rotor secured for rotation with an output shaft of the electric machine; and a parking gear secured for rotation with the output shaft of the electric machine and having a third number of external teeth spaced around a circumference configured to selectively engage a parking pawl between adjacent external teeth, wherein the parking gear, the rotor, and the output shaft include complementary angular alignment features to angularly orient the parking gear relative to the rotor in an angular position offset by an index angle from one of the magnetic poles of the rotor, wherein the index angle is based on the first number of phases, the second number of pole pairs, and the third number of external teeth.

2. The electrified vehicle of claim 1 wherein the third number of external teeth corresponds to a numerical factor of a number equal to two times the first number of phases multiplied by the second number of pole pairs.

3. The electrified vehicle of claim 2 wherein the electric machine is a three-phase electric machine, the rotor has four magnetic pole pairs, and the parking gear has eight external teeth.

4. The electrified vehicle of claim 1 wherein the output shaft includes an external spline cooperating with an internal spline of the parking gear to secure the parking gear for rotation with the output shaft, and wherein the complementary angular alignment features include a pattern of omitted ridges around the circumference of one of the output shaft and the parking gear corresponding with a pattern of widened ridges around the circumference of the other of the output shaft and the parking gear.

5. The electrified vehicle of claim 1 wherein the complementary angular alignment features comprise stamped alignment marks on at least two of the rotor, the parking gear, and the output shaft.

6. The electrified vehicle of claim 1, further comprising:

a traction battery; and an inverter coupled to the traction battery and operable to convert direct current (DC) power from the traction battery to multi-phase alternating current (AC) power provided to the electric machine by controlling a pair of switches associated with each one of the phases of the multi-phase AC power, and having a number of dead time periods when both switches of any of the pairs of switches are off;

wherein the parking gear, the rotor, and the parking pawl are angularly positioned relative to each other to minimize the number of dead time periods that coincide with the parking pawl being aligned between adjacent external teeth of the parking gear.

7. The electrified vehicle of claim 1 wherein the parking gear comprises asymmetrically spaced external teeth.

8. The electrified vehicle of claim 7 wherein the external teeth are asymmetrically spaced to minimize a number of dead time periods of an inverter that powers the electric machine that coincide with the parking pawl being aligned between adjacent external teeth of the parking gear.

9. An electrified vehicle comprising:

a multi-phase electric machine having a first number of phases and including a stator surrounding and separated by an air gap from a rotor having a second number of magnetic pole pairs, the rotor secured for rotation with an output shaft of the electric machine;

a parking gear secured for rotation with the output shaft of the electric machine and having a third number of external teeth spaced around a circumference;

a parking pawl pivotable about a pin to selectively engage the parking gear between adjacent external teeth;

a traction battery; and an inverter coupled to the traction battery and operable to convert direct current (DC) power from the traction battery to multi-phase alternating current (AC) power provided to the electric machine by controlling a pair of switches associated with each one of the phases of the multi-phase AC power, and having a number of dead time periods when both switches of any of the pairs of switches are off;

wherein the parking gear, the rotor, and the parking pawl are angularly positioned relative to each other to minimize the number of dead time periods that coincide with the parking pawl being aligned between adjacent external teeth of the parking gear.

10. The electrified vehicle of claim 9 wherein the output shaft includes an external spline cooperating with an internal spline of the parking gear to secure the parking gear for rotation with the output shaft, and wherein the output shaft and the parking gear include complementary patterns of omitted ridges around the circumference of one of the output shaft and the parking gear corresponding with a pattern of widened ridges around the circumference of the other of the output shaft and the parking gear.

11. The electrified vehicle of claim 9 wherein the parking gear, the rotor, and the output shaft include complementary angular alignment features.

12. The electrified vehicle of claim 9 wherein the parking gear comprises asymmetrically spaced external teeth.

13. The electrified vehicle of claim 12 wherein the external teeth are asymmetrically spaced to minimize a number of dead time periods that coincide with the parking pawl being aligned between adjacent external teeth of the parking gear.

14. The electrified vehicle of claim 9 wherein the parking gear and the output shaft comprise complementary angular alignment features comprising a key on either the parking gear or the output shaft and a complementary slot on the output shaft or the parking gear, respectively.

15. The electrified vehicle of claim 9 wherein the parking gear, the rotor, and the output shaft include complementary angular alignment features, the complementary alignment features comprising asymmetrical alignment features providing a single angular alignment.

16. An electrified vehicle comprising:

a multi-phase electric machine having a first number of phases and including a stator surrounding and separated by an air gap from a rotor having a second number of magnetic pole pairs, the rotor secured for rotation with an output shaft of the electric machine;

a parking gear secured for rotation with the output shaft of the electric machine and having a third number of external teeth spaced around a circumference;

a parking pawl pivotable about a pin to selectively engage the parking gear between adjacent external teeth;

a traction battery; and an inverter coupled to the traction battery and operable to convert direct current (DC) power from the traction battery to multi-phase alternating current (AC) power provided to the electric machine by controlling a pair of switches associated with each one of the phases of the multi-phase AC power, and having a number of dead time periods when both switches of any of the pairs of switches are off;

wherein the parking gear, the rotor, and the output shaft include complementary angular alignment features that angularly position the external teeth of the parking gear relative to magnetic poles of the rotor to minimize the number of dead time periods that coincide with the parking pawl being aligned between adjacent external teeth of the parking gear.

17. The electrified vehicle of claim 16 wherein the output shaft includes an external spline cooperating with an internal spline of the parking gear to secure the parking gear for rotation with the output shaft, and wherein the complementary angular alignment features include a pattern of omitted ridges around the circumference of one of the output shaft and the parking gear corresponding with a pattern of widened ridges around the circumference of the other of the output shaft and the parking gear.

* * * * *